United States Patent [19]

König et al.

[11] Patent Number: 4,657,940

[45] Date of Patent: Apr. 14, 1987

[54] 4,4'-DIISOCYANTO-PHENYLBENZYLETHER, A PROCESS FOR THE PREPARATION THEREOF AND USE IN THE PRODUCTION OF POLYURETHANE PLASTICS

[75] Inventors: Klaus König, Leverkusen; Peter Heitkämper, Dormagen, both of Fed. Rep. of Germany

[73] Assignee: Bayer Aktiengesellschaft, Leverkusen, Fed. Rep. of Germany

[21] Appl. No.: 829,041

[22] Filed: Feb. 13, 1986

[30] Foreign Application Priority Data

Feb. 28, 1985 [DE] Fed. Rep. of Germany ....... 3507021

[51] Int. Cl.$^4$ .............................................. C08G 18/14
[52] U.S. Cl. ..................................... 521/164; 521/167; 521/170; 521/172; 521/173; 521/174; 521/176; 528/76; 528/77; 528/78; 528/79; 528/80; 528/81; 528/83; 528/85; 560/347; 560/357; 560/359
[58] Field of Search ............... 521/164, 167, 170, 172, 521/173, 174, 176; 528/76, 77, 78, 79, 80, 81, 83, 85; 560/347, 359, 357

[56] References Cited

U.S. PATENT DOCUMENTS

| | | | |
|---|---|---|---|
| 3,180,883 | 4/1965 | Case | 260/453 |
| 4,421,870 | 12/1983 | Stutz et al. | 521/160 |
| 4,448,946 | 5/1984 | Stutz et al. | 528/67 |

OTHER PUBLICATIONS

Ullmanns Encyklopädie der Technischen Chemie, 4th edition, 1977, pp. 350–354, vol. 14.
Vysokomol Soedin, Ser. A, 1979, pp. 1075–1083.
Chemical Abstracts, vol. 91, 57576A, 1979.
Liebigs Annalen der Chemie, vol. 562, 1949, pp. 75 et seq.
Houben–Weyl, Methoden der Organischen Chemie, vol. E4, 4th edition, 1983, pp. 741—et seq.
Polyurethane Handbook by Dr. Gunter Oertel, Hanser Publishers, N.Y. (Bel. to corresp. to Becker, Braun, Kunststoff-Handbuch, vol. 7, 1983).

*Primary Examiner*—Maurice J. Welsh
*Attorney, Agent, or Firm*—Gene Harsh; Joseph c. Gil; Thomas W. Roy

[57] ABSTRACT

The present invention is directed to 4,4'-diisocyanto phenylbenzylether, its method of production by reaction of the corresponding diamine with phosgene and the use of the diisocyanate for the production of polyisocyanate polyaddition products, preferably polyurethane plastics.

4 Claims, No Drawings

4,4'-DIISOCYANTO-PHENYLBENZYLETHER, A PROCESS FOR THE PREPARATION THEREOF AND USE IN THE PRODUCTION OF POLYURETHANE PLASTICS

BACKGROUND OF THE INVENTION

1. Field of the Invention

The invention relates to 4,4'-diisocyanatophenylbenzylether, a process for the preparation thereof by the reaction of 4,4'-diaminophenylbenzylether with phosgene as well as the use thereof as isocyanate component in the production of polyisocyanate polyaddition products, preferably polyurethane plastics.

2. Description of the Prior Art

The properties of polyurethane plastics, in particular of polyurethane elastomers depend, among other things, essentially on the nature of the polyisocyanate used in the production of the plastics. Particularly high quality polyurethane elastomers are obtained when using 1,5-diisocyanato naphthalene as the diisocyanate component. Casting elastomers based on this diisocyanate, in particular, are distinguished by excellent mechanical properties (see, for example, Becker, Braun, Kunststoff-Handbuch, Volume 7, 2nd Edition, (1983), Carl Hanser Verlag).

1,5-diisocyanato naphthalene has the disadvantage, however, that the basic raw material used for its production, naphthalene is only available in limited amounts. The nitration of naphthalene also inevitably leads to an isomer mixture of nitronaphthalenes from which 1,5-dinitronaphthalene has to be isolated. Purification by distillation of the 1,5-diisocyanato naphthalene obtained from the dinitro compound by hydrogenation and subsequent phosgenation of the resulting diamine gives rise to problems as it has a tendency to sublimate. All of this means that high costs are incurred for 1,5-diisocyanato naphthalene.

The processing of 1,5-diisocyanato naphthalene is often difficult because its melting point and its vapor pressure are relatively high. These properties often prevent 1,5-diisocyanato naphthalene from being reacted directly as a melt. Technically complicated processing methods and protective measures are then required to avoid chemical and health problems.

Consequently, there have been many attempts to find an equivalent replacement for 1,5-diisocyanato naphthalene as diisocyanate component in the production of high quality polyurethane plastics.

Thus, for example, DE-OS No. 31 38 421 and DE-OS No. 31 38 422 describe the production of polyurethane elastomers using 4,4'-diisocyanto-1,2-diphenylethane as diisocyanate component. Although plastics having good mechanical properties can be obtained using this diisocyanate, the production of 4,4'-diisocyanato-1,2-diphenylethane is very inconvenient and expensive and, up until now, has been very difficult to carry out industrially.

Furthermore, numerous attempts to use the relatively inexpensive 4,4-diisocyanato-diphenylmethane instead of 1,5-diisocyanato naphthalene for the production of high quality polyurethane elastomers have been made, but all previous attempts to produce polyurethane elastomers based on this diisocyanate having equivalent mechanical and thermal properties to the polyurethane elastomers based on 1,5-diisocyanato naphthalene have failed.

Accordingly, it was the aim of the present invention to provide a new diisocyanate which is comparable to 1,5-diisocyanato naphthalene with respect to its suitability for the production of high quality polyurethane elastomers and which can be produced economically by simple processes.

This aim could be achieved by 4,4'-diisocyanato phenylbenzylether corresponding to the formula

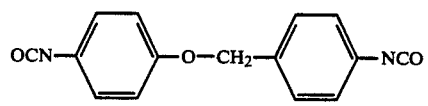

and the process for the production thereof.

SUMMARY OF THE INVENTION

The present invention is directed to 4,4'-diisocyanato phenylbenzylether.

The present invention is also directed to a process for the production of 4,4'-diisocyanato phenylbenzylether by reacting 4,4'-diamino phenylbenzylether with phosgene.

The present invention is further directed to the use of 4,4'-diisocyanato phenylbenzylether as the isocyanate component in the production of polyisocyanate polyaddition products, preferably polyurethane plastics, by the isocyanate polyaddition process.

DETAILED DESCRIPTION OF THE INVENTION

The 4,4'-diamino phenylbenzylether corresponding to the formula

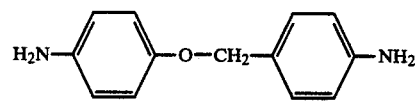

used as starting material when carrying out the process according to the invention is known and described in the literature, for example, in Vysokomol. Soedin., Ser. A, 1979, pages 1075 to 1083: chemical abstracts, volume 91, 57576a, 1979. The diamine is preferably produced from the corresponding dinitro compound by catalytic hydrogenation. The diamine can also be prepared by any other method for use in the process according to the invention.

The 4,4'-dinitro phenylbenzylether forming the basis of the diamine is easily obtainable. It can be produced, for example, by condensation of alkali-4-nitrophenylate with 4-nitrobenzyl chloride or by any other method.

The diamine to be phosgenated according to the invention can be used in the process according to the invention in industrial purity, as formed during its production, or also in purified form. It can be purified, for example, by dissolving it in dimethyl formamide and subsequently precipitating it with water or by distillation.

The phosgenation according to the invention is carried out by known methods of the type described, for example, in Liebigs Annalen der Chemie, volume 562, 25 1949, pages 75 to 109, in Ullmanns Encyclopädie der Technischen Chemie, volume 14, 4th edition, 1977, pages 350 to 354 or in Houben-Weyl, Methoden der Organischen Chemie, volume E4, 4th edition, 1983, pages 741 to 753.

The reaction can be carried out continuously or intermittently, preferably in the presence of an inert solvent. Suitable solvents include the solvents normally used for phosgenation such as aliphatic, cycloaliphatic or aromatic hydrocarbons, halogen hydrocarbons, nitrohydrocarbons, aliphatic-aromatic ethers, aromatic ethers, carboxylic acid esters, carboxylic acid nitriles, sulphones, phosphoric acid halides or phosphoric acid esters. Examples of suitable solvents include trimethylpentane, decahydronaphthalene, toluene, 1,2-dichloroethane, chlorobenzene, chlorotoluene, 1,2-dichlorobenzene, nitrobenzene, anisole, phenetole, diphenylether, acetic acid butylester, tetramethylene sulphone, phosphoroxychloride, phosphoric acid trimethylester. Industrial 1,2-dichloroethane or industrial chlorobenzene or industrial 1,2-dichlorobenzene are preferably used as solvent. Any mixtures of the solvents mentioned above by way of example may also be used.

4,4'-diamino phenylbenzylether is only slightly soluble at low temperatures in most of the solvents mentioned above by way of example. Consequently, when carrying out the process according to the invention, the solvents mentioned by way of example mainly perform the function of a suspension agent for the diamine, especially at the low phosgenation temperatures. The solvents perform the function of a genuine solvent for the starting material and, in particular, the product of the process only at higher temperatures and with progressive conversion of the starting material.

The mixtures of starting material to be phosgenated and solvent which are to be used in the process according to the invention are generally "solution suspensions" containing from about 2 to 70% by weight of diamine. The term "solution suspension" indicates that the diamine is partially dissolved and partially suspended.

The phosgenation reaction according to the invention may be conducted according to the known "cold-hot phosgenation" process in two stages or according to "hot phosgenation" process in one stage. During "cold-hot phosgenation" the reaction of the starting material to be phosgenated generally takes place at the beginning of the reaction at about −20° to +40° C., preferably about −10° to +30° C., and the subsequent hot phosgenation reaction takes place at about 40° to 260° C., preferably about 80° to 220° C. During this "cold-hot phosgenation" the range between the starting temperature and the elevated temperature can be passed through uniformly or in jumps.

During "hot phosgenation" the starting material to be phosgenated comes into contact with the phosgene immediately at temperatures of about 40° to 260° C., preferably about 80° to 220° C.

In all variations of the phosgenation reaction according to the invention, the reaction is preferably carried out under normal pressure or elevated pressure. The reaction pressure is generally about 0.9 to 100, preferably about 1 to 60 bar.

During the phosgenation reaction according to the invention, the starting material to be phosgenated is generally combined with about a 1 to 10 fold, preferably 1.05 to about 6 fold stoichiometric quantity of phosgene. The quantity of phosgene can be introduced in one portion or in aliquots into the reaction mixture.

It may be advantageous, for example during an intermittent operation, to initially introduce into the reaction mixture one portion of the phosgene to be used and to introduce the remainder into the reaction mixture in further portions or continuously over a prolonged period.

The phosgenation of the diamine according to the invention can be accelerated by the addition of catalysts such as dimethyl formamide and/or acid acceptors such as pyridine. Generally, however, the reaction rates during phosgenation of the diamine are adequate even without the addition of such a catalyst.

The reaction period during phosgenation according to the invention is dependent on the reaction conditions adopted, in particular on the reaction temperatures, the phosgene excess, the dilution with solvent and the optional catalysts and/or acid acceptors.

On completion of the phosgenation reaction, the reaction mixture is worked up in known manner by separation of gaseous constituents (hydrogen chloride, excess phosgene) and by removal of the solvent by distillation. Before removing the solvent by distillation, any solid by-products which may be present are removed by filtration or centrifuging. The crude product obtained as distillation residue after removal of the solvent by distillation can be purified, if desired, by recrystallization from a suitable inert solvent, for example ligroine, or preferably by distillation.

Although the diisocyanate according to the invention is a heat stable substance, it may be desirable to carry out distillation of the diisocyanate without high thermal stresses, for example by means of a thin film evaporator. If desired, the diisocyanate according to the invention can also be freed from undesirable by-products, for example thermolabile, chlorine-containing compounds, after purification by heat treatment at temperatures of about 160° to 250° C., preferably about 180° to 230° C.

With the use according to the invention of the new diisocyanate for the production of polyisocyanate polyaddition products, preferably polyurethane plastics and in particular of solid or cellular polyurethane elastomers, the diisocyanate according to the invention is reacted with the known reactants, i.e., compounds having isocyanate-reactive hydrogens such as polyamines and preferably polyols, instead of the diisocyanates formerly used for this purpose, (see, for example, the literature references already mentioned at the outset or also "Kunststoff-Handbuch", volume VII, "Polyurethane" by Vieweg und Hochtlen, Carl Hanser Verlag, Munich (1966), in particular pages 206–297).

Thus, for example, polyurethane elastomers are produced from the diisocyanate according to the invention by reacting it with (a) di-functional or tri-functional polyhydroxyl compounds having a molecular weight in the range of 400 to about 10,000, preferably about 800 to 3000, especially polyhydroxy polyesters or polyhydroxy polyethers, (b) chain extenders having a molecular weight in the range of 60 to 399, i.e., compounds which are di-functional in the context of the isocyanate addition reaction and having alcoholic hydroxyl groups or primary and secondary amino groups, optionally in the presence of (c) further auxiliaries and additives known from polyurethane elastomer chemistry.

The reaction may be carried out by the known prepolymer process (reaction of the diisocyanate with component (a)) while observing an equivalent ratio of isocyanate groups to groups which are reactive towards isocyanate groups of greater than about 1.3:1 and subsequent reaction of the NCO prepolymer thus obtained with component (b). The reaction may also be carried out in one stage by reaction of the diisocyanate with a mixture of components (a) and (b). In both variations, the equivalent ratio of isocyanate groups to total quantity of groups which are reactive towards isocyanate groups is generally about 0.8:1 to 1.3:1, preferably about 0.95:1 to 1.1:1. The temperatures at which these reactions are carried out are generally about 60° to 180° C., preferably about 80° to 150° C. The reactions can be carried out in the presence or also in the absence of suitable inert solvents.

The polyurethane plastics produced with the diisocyanate according to the invention, in particular the polyurethane elastomers, can be solid as well as cellular products. Both types of polyurethane elastomers are produced by the known processes of the type described, for example, in the last-mentioned literature reference. Thus, for example, cellular polyurethane elastomers may be produced using water as chain extender.

The plastics produced with the diisocyanate according to the invention have high quality mechanical and thermal properties. They are therefore eminently suitable as spring and damping elements, buffers, wheel coverings, seals, shoe soles and similar materials in which the material is exposed to extreme mechanical and thermal stresses.

The invention is further illustrated, but is not intended to be limited by the following examples in which all parts and percentages are by weight unless otherwise specified.

EXAMPLES

Example 1

Production of 4,4'-diisocyanato phenylbenzylether

A solution of 400 g of phosgene in 1.6 l of anhydrous 1,2-dichloroethane was placed in a 6 l laboratory phosgenation apparatus. A solution of 214 g of 4,4'-diamino phenylbenzylether (purity determined by analysis: 99.7%) in 2.2 l of anhydrous 1,2-dichloroethane, heated to 70° C., was added dropwise to the solution with stirring and cooling in such a way that the reaction temperature was between 10° and 20° C. The reaction mixture was then heated to reflux (77° C.) within 3 hours with further introduction of phosgene (about 50 g/h). After a further 1.5 hours of phosgenation with reflux, a clear solution was formed. The final reaction mixture was freed from excess phosgene and solvent by distillation and then subjected to fractional distillation in a vacuum. After one run (11 g of yellowish liquid), 4,4'-diisocyanato phenylbenzylether distilled over at 0.4 mbar and 180° to 195° C. as a colorless liquid which rapidly solidified into crystals having a melting point of 88°–90° C.

Residue: 14 g of dark-colored solid product.

Yield of diisocyanate: 243 g (92% of theoretical yield)

$C_{15}H_{10}N_2O_3$ (266.3)

Hydr. chlorine: 580 ppm

NCO content: calculated 31.6%; found 31.8%

The diisocyanate could be redistilled substantially without residue.

Example 2

Production of 4,4'-diisocyanato phenylbenzylether

A solution of 400 g of phosgene in 1.6 l of anhydrous chlorobenzene was placed in a 6 l laboratory phosgenation apparatus. A solution of 214 g of 4,4'-diamino phenylbenzylether (purity determined by analysis: 95.9%) in 2 l of anhydrous chlorobenzene which had been heated to 90° C. was added dropwise with stirring and cooling in such a way that the reaction temperature was between 10° and 20° C. The reaction mixture was then heated to reflux (125° C.) within 3.5 hours with further introduction of phosgene (about 50 g/h). After a further hour of phosgenation with reflux, an almost clear solution was formed. The reaction mixture was then freed from excess phosgene and solvent by distillation. The remaining crude product was recrystallized from anhydrous ligroine. After filtration, washing with petroleum ether and drying, 211 g (83% of theoretical yield) of 4,4'-diisocyanato phenylbenzylether were obtained in the form of colorless crystals.

Melting point: 88°–89° C.

Hydr. chlorine: 940 ppm.

200 g of the crystals obtained were subjected to distillation under vacuum. The diisocyanate distilled without first runnings at 0.4 mbar and 180° to 190° C. as a colorless, quickly solidifying liquid.

Yield: 196 g

Hydr. chlorine: 440 ppm

Distillation residue: 1.3 g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. 4,4'-diisocyanato phenylbenzylether.

2. A process for the production of 4,4'-diisocyanato phenylbenzylether which comprises reacting 4,4'-diamino phenylbenzylether with phosgene.

3. A process for the production of a polyisocyanate polyaddition product which comprises reacting 4,4'-diisocyanato phenylbenzylether with a compound containing isocyanate-reactive hydrogens.

4. The process of claim 3 wherein said polyisocyanate polyaddition product is a polyurethane plastic and said compound containing isocyanate-reactive hydrogens comprises a polyol.

* * * * *